Patented May 21, 1940

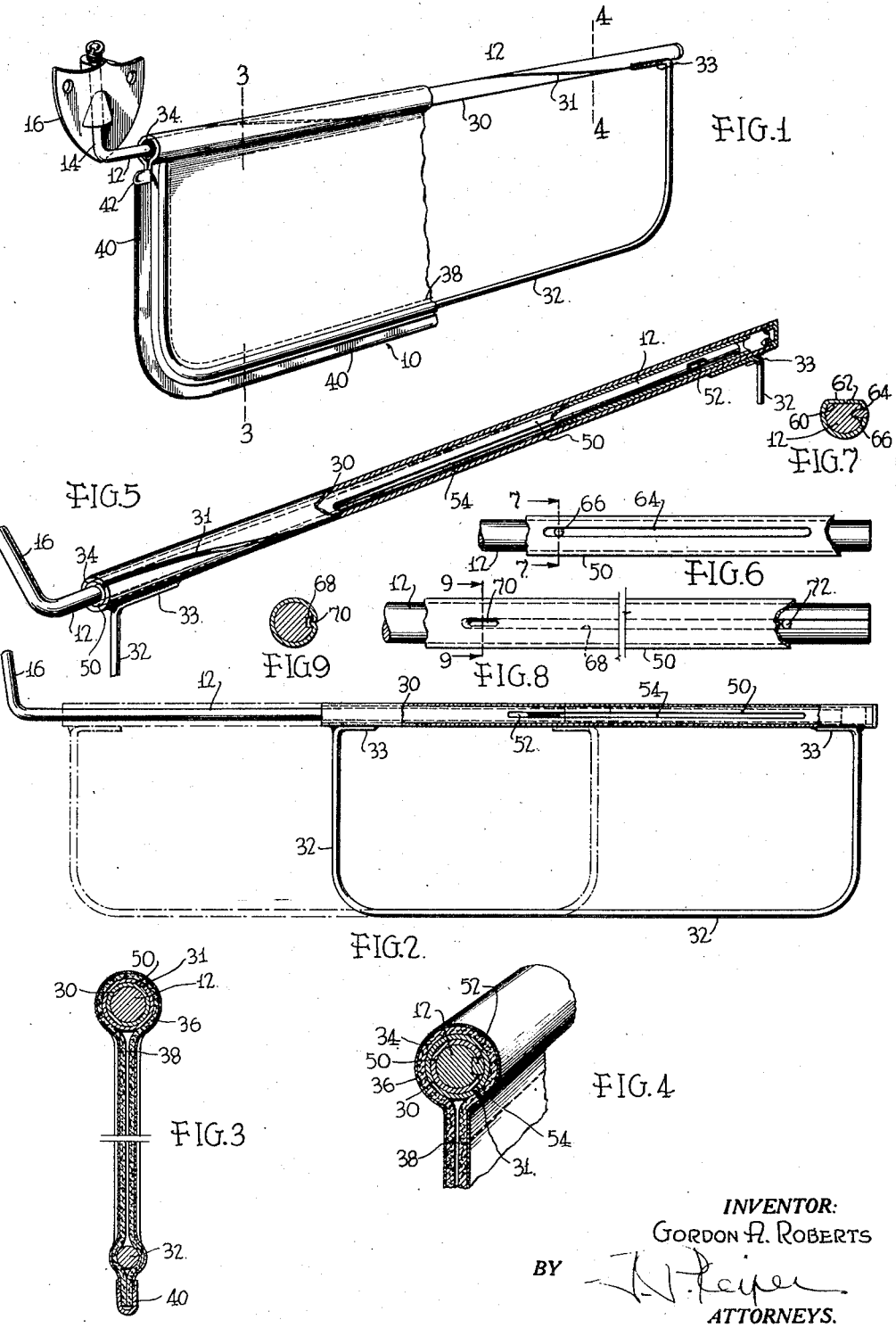

2,201,348

UNITED STATES PATENT OFFICE 2,201,348

VISOR

Gordon A. Roberts, Grosse Pointe, Mich.

Application May 31, 1938, Serial No. 210,834

12 Claims. (Cl. 296—97)

This invention relates to visors adapted for automotive vehicle use and more particularly to a sliding and friction swivel support for the same.

In visors used in conjunction with automotive vehicles and more especially the windshields thereof, an adjustable support capable of permitting considerable variation in the placing of the visor is quite essential. It is also necessary that means be provided for adequately fixing the visor in whatever position it is placed, so the driver may utilize the visor to avoid sun, headlight and other glares, and be assured that once it is in a preferred adjusted position, road shocks will not disturb its position. In an application Serial No. 191,066, filed February 17, 1938 there is shown one form of a novel friction swivel connection which is capable of angularly holding a visor in any adjusted angular position and yet of simple, rugged construction.

The present invention is an improvement thereupon and provides an additional adjustment of a sliding nature, greatly adding to the range of positions in which the visor may be placed.

Accordingly it is an object of the present invention to provide a visor of improved form capable of smooth frictional pivotal adjustment and, in addition, capable of being slidably supported for positioning at varying distances from its support within the car body, and of a simple rugged and inexpensive construction.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing, wherein similar reference characters refer to similar parts throughout the several views:

Figure 1 is a view of the visor with its support, with a portion of the covering material cut away to expose the frame;

Figure 2 is a view of the visor with its support extended in a manner to illustrate the range of adjustment afforded by the present improvement;

Figure 3 is a transverse enlarged section taken through Figure 1 on the line 3—3;

Figure 4 is a transverse enlarged section of a portion of Figure 1 and taken on the line 4—4;

Figure 5 is an enlarged view of a portion of the visor frame support rod, and intervening sliding sleeve, the frame and sleeve being partly shown in longitudinal section;

Figure 6 is an alternative construction;

Figure 7 is a section through Figure 6 taken on the line 7—7;

Figure 8 is a further alternative construction; and

Figure 9 is a section through Figure 8 taken on the line 9—9.

Referring to Figure 1 there will be seen a visor generally indicated as at 10, and supported on a rod 12. The rod has a bent portion 14 swivelled in a bracket plate 16 in any preferred manner, or, for example, as illustrated in the hereinbefore referred to copending application.

The visor proper comprises a rectangular frame composed of two members, one being in the form of a twisted open tube 30 having a spiral slot 31, and the other a heavy wire 32 bent to form a broad U, the ends 33 of which may be flattened, bent inwardly and brazed, or welded to the tube 30. A covering of semi-rigid fibrous material 34 and fabric 36 is folded around the twisted tube 30 and stitched as at 38 around the frame members, and a suitable binding 40 terminating under suitable clips 42 completes the visor.

In order to support the visor 10 from the rod 12 in a manner such that the visor can be readily slid thereon, and yet offer sufficient resistance to turning to maintain its adjusted position, a sleeve 50 is interposed between the rod and the visor frame tube 30. The sleeve is in effect splined on the rod 12 by means of a rod carried key 52 acting in a longitudinal elongated slot 54 in the sleeve 50. The visor tube 30 is adapted to closely embrace and frictionally grip the sleeve 50 so that forceful turning relative thereto may be effected to any set position, but on the other hand, the sleeve 50 is prevented from turning relative to the rod by the key 52 and slot 54. Thus the sleeve, while being prevented from turning, is permitted to slide, in practice as much as eight or more inches (depending on the length of slot 52) along the support rod 12, so that a considerable additional range of position adjustment is afforded the visor frame.

Not only is the construction of the visor frame inexpensive, it requiring but two parts for frame and friction grip altogether, but the spiral slot lends itself readily to the necessary close uniform frictional embrace over the longitudinally slotted sleeve 50, the angle of the spiral slot assuring a minimum of interference with the longitudinal slot in the sleeve and thereby assuring substantially uniform frictional gripping in each and every selected position.

Modified arrangements for preventing relative rotation between the sleeve 50 and rod 12 are illustrated in Figures 6 to 9 inclusive. In Figures 6 and 7, the rod is provided with a flat side 60, and the sleeve 50 is flattened in a corresponding fashion as shown at 62, to prevent relative rotation. A slot 64 is provided in the sleeve 50 to engage a pin 66 set in the rod 12 to limit the extent of sliding movement.

In Figures 8 and 9, the rod 12 is grooved at 68 and a portion of the sleeve 50 is upset inwardly into the groove in the form of a depression to provide an integral key 70. The extent of sliding movement may be limited by the ends of the groove 68, or if it be preferable, to extend the groove from end to end, pins 72 similar to the pins 66 may be set in the groove at proper points.

Though only one embodiment of the invention and with several modifications have been illustrated and described, it is to be understood that the invention is not limited thereto, but may be embodied in various mechanical forms and arrangements. As various changes in construction and form may be made without departing from the spirit of the invention, as will be apparent to those skilled in the art, reference will be had to the appended claims for a definition of the limits of the invention.

What is claimed is:

1. In a visor frame and support, a support rod, a sleeve slidable thereon, a tube with a spiral slot extending longitudinally thereof, and means for preventing relative rotation between said sleeve and said rod.

2. In a visor frame and support, a sleeve having a longitudinal slot therein, and a tube closely and frictionally embracing said sleeve, said tube having a long spiral slot therein and forming a part of a visor frame.

3. A visor comprising a support rod, a frame pivoted around said support rod and having a tubular part concentric with said rod with a spiral slot extending along the length thereof, and means interposed between said rod and tube non-rotatably and slidably supported on said rod and frictionally engaged by said tube.

4. An automobile windshield visor comprising a support, a rod having a bent end portion pivoted on said support, a slidable but non-rotatable sleeve on the other end of said rod, a visor frame supported on said rod, said frame comprising a spirally slotted tubular member in close frictional embrace with said sleeve, and a complementary frame member secured to said tubular member.

5. An automobile windshield visor comprising a support rod, a slidable but non-rotatable sleeve on said rod, a visor frame supported on said rod, said frame comprising a spirally slotted tubular member in close frictional embrace with said sleeve, and a complementary frame member secured to said tubular member.

6. A visor frame comprising a straight tubular member having a spiral slot therein, complementary means for completing the frame secured to said member and a support sleeve splined on a support rod inserted into said tube and frictionally gripped by the tube.

7. A visor frame comprising a straight tubular member having a long spiral slot thereon extending from one end to the other, a complementary frame member secured to said tube at each end thereof, a support rod extending into said tube and a sleeve splined on said rod and frictionally gripped in said tube, whereby relative rotation between said frame and rod is prevented without a forceful turning application, but free sliding is afforded.

8. In a visor frame and support, a support rod, a sleeve slidable thereon, a tube with a spiral slot extending longitudinally thereof closely and frictionally embracing said sleeve, means for preventing relative rotation between said sleeve and said rod, and means for limiting relative sliding movement between said sleeve and rod.

9. In a visor frame and support, a support rod, a sleeve slidable thereon, a tube with a spiral slot extending longitudinally thereof, said rod having a flat side, and said sleeve having a corresponding flat side to prevent relative rotation therebetween, and said sleeve having a slot extending lengthwise thereof and said rod having a pin engaging said slot and limiting the relative sliding movement between said rod and sleeve.

10. In a visor frame and support, a support rod, a sleeve slidable thereon, a tube with a spiral slot extending longitudinally thereof, said rod having a groove therein, and said sleeve having an integral key struck therein and depressed into said groove to provide a key for preventing relative rotation between said sleeve and rod, and a pin in said groove adapted to engage said key to limit the relative sliding movement between said rod and sleeve.

11. A visor frame and support comprising a support rod, means for adjustably supporting one end thereof on a vehicle body, a sleeve slidably extending over said rod, means for preventing relative rotation between said rod and sleeve, and a visor frame frictionally pivoted on said sleeve and having a substantially tubular frame portion thereof extending around said sleeve and rod.

12. A visor frame and support comprising a support rod for adjustably supporting one end thereof on a vehicle body, a sleeve telescoping said rod, a visor frame having a substantially tubular frame portion telescoping said rod and sleeve, means for preventing relative rotation while permitting sliding movement between said sleeve and one of said support rod and frame, and means for frictionally resisting relative rotation between said sleeve and the other of said support rod and frame.

GORDON A. ROBERTS.

CERTIFICATE OF CORRECTION.

Patent No. 2,201,348. May 21, 1940.

GORDON A. ROBERTS.

It is hereby certified that error appears in the above numbered patent requiring correction as follows: In the drawing, in the space indicated for signature of attorney, insert --F. P. Keiper--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.